(12) United States Patent
Muona

(10) Patent No.: US 12,084,968 B2
(45) Date of Patent: Sep. 10, 2024

(54) APPARATUS, ROCK DRILLING RIG AND METHOD FOR MINING NAVIGATION

(71) Applicant: SANDVIK MINING AND CONSTRUCTION OY, Tampere (FI)

(72) Inventor: Jouko Muona, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 161 days.

(21) Appl. No.: 17/763,510

(22) PCT Filed: Sep. 28, 2020

(86) PCT No.: PCT/EP2020/077082
§ 371 (c)(1),
(2) Date: Mar. 24, 2022

(87) PCT Pub. No.: WO2021/058817
PCT Pub. Date: Apr. 1, 2021

(65) Prior Publication Data
US 2022/0349257 A1  Nov. 3, 2022

(30) Foreign Application Priority Data
Sep. 27, 2019 (EP) .................... 19200041

(51) Int. Cl.
*E21B 7/02* (2006.01)
*E21D 9/00* (2006.01)
*E21D 9/14* (2006.01)

(52) U.S. Cl.
CPC .............. *E21B 7/022* (2013.01); *E21B 7/027* (2013.01); *E21D 9/003* (2013.01); *E21D 9/006* (2013.01); *E21D 9/14* (2013.01)

(58) Field of Classification Search
CPC ......... E21B 7/022; E21B 7/027; E21D 9/003; E21D 9/006; E21D 9/14
See application file for complete search history.

(56) References Cited

U.S. PATENT DOCUMENTS

| | | |
|---|---|---|
| 5,310,248 A | 5/1994 | King et al. |
| 8,453,759 B2 | 6/2013 | Saeleniemi et al. |

(Continued)

FOREIGN PATENT DOCUMENTS

| | | | | |
|---|---|---|---|---|
| AU | 7534198 A | * | 12/1998 | |
| AU | 2008240564 A1 | * | 10/2009 | ............. E21B 7/022 |

(Continued)

OTHER PUBLICATIONS

Atlas Copco: "Underground Mining Equipment; RCS Rig Control System; Following the Orebody With Accuracy; Drilling the Perfect Contour", Underground Mining Equipment, Atlas Copco, pp. 1-9, Sep. 13, 2004, Retrieved from Internet: URL: http://www.atlascopco.com/us/news/productnews/general.aspx "Following with Orebody with Accuracy"; pp. 54-56.

*Primary Examiner* — Frederick L Lagman
(74) *Attorney, Agent, or Firm* — Corinne R. Gorski (57) ABSTRACT

An apparatus, rock drilling rig, method and computer program for executing navigation for a rock drilling rig in a mine tunnel. The rock drilling rig is positioned at faces of rounds and is navigated before initiating drilling. The navigation is executed without a predetermined tunnel line. The realized tunnel line is formed by combining navigation data on several rounds. Length and direction of the round to be drilled next may be adjusted according to need.

16 Claims, 5 Drawing Sheets

(56) References Cited

U.S. PATENT DOCUMENTS

| | | | | |
|---|---|---|---|---|
| 9,778,009 B2 * | 10/2017 | Muona | ............... | F42D 3/04 |
| 10,174,614 B2 * | 1/2019 | Puura | ............... | E21B 3/00 |
| 10,208,595 B2 * | 2/2019 | Kouhia | ............... | E21C 35/24 |
| 2016/0333690 A1 * | 11/2016 | Puura | ............... | E21D 9/003 |

FOREIGN PATENT DOCUMENTS

| | | | | | |
|---|---|---|---|---|---|
| AU | 2018223937 A1 * | 8/2019 | ............ | E21B 44/00 |
| CN | 101663463 A * | 3/2010 | ............ | E21B 7/022 |
| CN | 102782241 A * | 11/2012 | ............ | E21B 7/022 |
| CN | 105164372 A * | 12/2015 | ............ | B23Q 5/265 |
| JP | 2003085594 A | 3/2003 | | |
| RU | 2443866 C2 * | 2/2012 | ............ | E21B 7/022 |
| WO | 2012172180 A1 | 12/2012 | | |
| WO | WO 2015/107068 A1 | 7/2015 | | |

* cited by examiner

FIG. 9

APPARATUS, ROCK DRILLING RIG AND METHOD FOR MINING NAVIGATION

RELATED APPLICATION DATA

This application is a § 371 National Stage Application of PCT International Application No. PCT/EP2020/077082 filed Sep. 28, 2020 claiming priority to EP 19200041.2 filed Sep. 27, 2019.

BACKGROUND OF THE INVENTION

The invention relates to an apparatus for navigating a rock drilling rig in a mining tunnel.

The invention further relates to a rock drilling rig implementing the apparatus and also to a method and computer program for navigating the rock drilling rig in a mining tunnel, which mining tunnel is advanced in several successive rounds.

In mines underground tunnels are excavated by utilizing drilling and blasting method wherein rock material is removed in several successive rounds. The mining tunnel may be a production tunnel or a connection tunnel. Nowadays the mining tunnel is advanced in accordance with a predetermined tunnel line, which is designed in the office. Then the rock drilling rig is positioned and navigated for each round so that the planned tunnel is achieved. Typically the navigation is based on simple markings made on the rock surface. The present way of working contains some disadvantages regarding adjustability and ability to provide useful monitoring data.

BRIEF DESCRIPTION OF THE INVENTION

An object of the invention is to provide a novel and improved solution for mining navigation.

An idea of the disclosed solution is that the disclosed apparatus comprises one or more data processing devices for executing at least one navigation program in order to navigate a rock drilling rig in a mining tunnel. The apparatus is provided with positioning data relating to determined position and direction of the rock drilling rig relative to a previously excavated round. The apparatus determines direction and length of each following new round in response to input data and takes the selected direction and length into consideration in the navigation. The apparatus also generates a tunnel line for the mining tunnel by combining the navigation results of each successive rounds one by one. The apparatus further executes coordinate transformations between a machine coordinate system of the rock drilling rig and a mine coordinate system, and presents and stores the produced mining tunnel line in the mine coordinate system. Thus, in the present solution the realized mining tunnel line is created and stored as the mining proceeds.

An advantage of the disclosed solution is that data on the realized successive rounds is combined as a greater entity, and still, the gathered data relating to each individual round is available for detailed examination. Positions and locations of every round is known in the mine coordinate system and all the data relating to each round can be analyzed later for any reason. This way, valuable drilling specific data with location data is available and may be stored for later usage, such as for executing succeeding mining procedures after the drilling and blasting.

The location linked data may also be analyzed for generating data on success of the drilling process and for improving future excavation measures and processes. Deviations can be noted more easily when examining the combined data. Corrective measures and special arrangements may be targeted to the detected locations and issues. For example, safety related issues may be examined and notifications may be done. To sum up, more reliable and versatile realized follow-up data is provided not only for the employees but also for the owner of the mine and other collaborators.

According to an embodiment, every new round formed by means of the drilling and blasting method is attached on an extension of a string of the previously formed rounds. The new round may deviate from the previous round in lateral direction and also in elevation, and the directional selections of the new round are taken smoothly into consideration when the new round is combined to the string.

According to an embodiment, the navigation is executed without a pre-designed tunnel line determining exact directions and locations for the rounds. In the present solution an initial direction or preliminary tunnel line may be used at the beginning of the process but the realized mining tunnel line is generated during the excavation measures, whereby it is dynamically formed.

According to an embodiment, the solution determines the mining tunnel line for the realized mining tunnel by combining navigation data of the successive realized rounds. Thus, the apparatus stiches navigation data together and generates the mining tunnel line loaded with desired additional data elements. The mining tunnel line is in a way being drag further on with the rock drilling rig while the mining tunnel advances by utilizing the drilling and blasting method for several successive rounds.

According to an embodiment, the apparatus is provided with data dedicated to individual rounds. The apparatus is further configured to combine the round specific data with the produced mining tunnel line.

According to an embodiment, the solution comprises combining measuring while drilling data with the data of the realized mining tunnel. The rock drilling rig and especially the rock drilling unit is provided with several sensor and measuring devices for sensing drilling operations. The gathered valuable data is connected to the location data and may be analyzed and displayed later.

According to an embodiment, geological data is combined with the data of the realized mining tunnel. Geological data may be gathered from the sensing devices, or alternatively or in addition to, visual or other detections made by the operator may be stored as a geological data. For example, the operator may note visually direction of ore lode and this observation may be stored as the geological data. Further, if the round collapses when being blasted, it indicates very poor quality of rock material at that round, and this observation may also be recorded.

According to an embodiment, data on success of blasting of the previous round may be detected by examining face of the mine tunnel. Then, a so called blasting efficiency factor may be determined. The blasting efficiency factor may, for example, indicate how efficiently rock material volume is being blasted and removed. The blasting efficiency may be examined in relation to number of drilled holes, for example. The blasting efficiency may be stored for each round and reasons for undesired blasting efficiency factor may be analyzed later so that future drilling pattern planning and charging plan design may be improved.

According to an embodiment, produced sensing data and location data is tied together. Then improved analytics may be executed along the tunnel advance, whereby trends in the process and rock material may be noted. Further, the realized tunnel and the related data may be visualized in an intuitive manner for different parties, such as to contractors, collaborators and investors.

According to an embodiment, number of realized reinforcing holes as well as their position data may be stored as a round specific data. This way following reinforcing measures may be facilitated and proper documentation is provided. The round specific data can be combined to data on other rounds and may also be examined as a greater entity.

According to an embodiment, the apparatus is configured to display the produced mining tunnel line with the realized drill holes and round specific data on a display device. This way valuable visual information on the mine tunnel may be provided for different parties concerned.

According to an embodiment, the apparatus is provided with an analyzing program and is configured to analyze the gathered drilling data of the rounds and in accordance with the location data of the dedicated round on the mining tunnel line. The analyzing program may automatically detect selected interesting or critical issues and may generate alarms and messages when predetermined criteria is exceeded. The analyzing program may also generate reports and visual presentations on the current situation of the mining tunnel.

According to an embodiment, the direction of the mining tunnel is determined during the navigation process of each round. Then the apparatus adjusts the directions of the rounds on the basis of received manual control commands.

According to an embodiment, the apparatus is provided with a visual user interface presented on a display device, and the user interface comprises elements indicating and adjusting lateral angle and elevation angle of each round.

According to an embodiment, the user interface mentioned in the previous embodiment further comprises an element for indicating and adjusting length of each round.

According to an embodiment, determination of the direction of the next round to be drilled is based on geological issues which have been exposed after the previous round has been excavated. The user may note by visual inspection that direction of the ore lode changes for the expected direction and this visual observation may be taken into consideration when deciding direction of a new round. The visual observation of the ore lode may also influence to selected length of the next round.

According to an embodiment, direction of the excavation may be decided separately for each round at the drilling site and is thereby not decided beforehand on mine engineer's desk. In case the ore lode suddenly changes its direction decision on direction can be made instantly at the working site. Thus, the solution guarantees maximum operational flexibility and adjustability for changing circumstances in mines.

According to an embodiment, after each blast of the round the rock drilling rig needs to be navigated in accordance with the latest round being blasted. Thanks to the navigation procedure, the position and orientation of the rock drilling rig is known and the coordinate data is connected to the mine coordinate system. Thereafter it is possible to continue advancing the mining tunnel in the same direction, or it is possible to make desired adjustments and to direct the excavation heading into desired direction.

According to an embodiment, the apparatus is configured to demonstrate the adjusted directions of the new round for an operator by moving the drilling unit to point towards the modified direction. Thereby, the operator is provided with practical visualization of the directions. This solution may improve accuracy of the adjustment and may prevent false selections.

According to an embodiment, the apparatus is configured to present on a display device graphical input elements allowing change of horizontal direction and change of vertical direction before finalizing navigation of the rock drilling for the following new round to be drilled.

According to an embodiment, the apparatus is provided with a graphical user interface and includes a graphical input element for changing direction, i.e. changing a compass direction angle.

According to an embodiment, the apparatus is provided with a graphical user interface and includes a graphical input element for changing elevation, i.e. changing inclination angle.

According to an embodiment, the changed horizontal and vertical directions are indicated to the control system by means of a rock drilling unit. Then realized sensing data relating to the changed position of the rock drilling unit is input to the apparatus. In other words, the rock drilling unit is utilized as a physical indicator for indicating changes in directions between the previous round and the new round to be drilled.

According to an embodiment, the apparatus is configured to direct a drilling pattern of the round in response to the input changes in horizontal and vertical directions of the next round. The decisions regarding the changes in the direction are made dynamically as the excavation proceeds further.

According to an embodiment, if no changes to the directions are made, then the apparatus directs the drilling pattern in the direction of the new tunnel line. In other words, the same direction is continued until new direction data is input to the apparatus.

According to an embodiment, new rounds may generated on a curved tunnel line in case curved tunnel part is needed or when direction of the ore lode turns.

According to an embodiment, the apparatus is provided with input data on modified length of the round, whereby the apparatus is configured to adjust length of a drilling pattern for the next round in response to the input data of the modified length.

According to an embodiment, the length of the round may be adjusted when relatively tight curves with short radius of curvature are ahead, and also when there occurs sudden changes in rock quality, ore content and other geological properties, for example.

According to an embodiment, the apparatus is located onboard a rock drilling rig, whereby the mining tunnel line is generated at the drilling site during the operation of the rock drilling rig. The apparatus comprises a data communication device for communicating the generated mining tunnel line at intervals from the drilling site to at least one external electronic device. In other words, the mining tunnel line is at first generated at the drilling site and is then transmitted to a server, and not vice versa.

According to an embodiment, the apparatus is configured to attach pre-designed drilling patterns to each round during the navigation, wherein the drilling patters comprise data on drill holes to be drilled. The apparatus is configured to execute coordinate transformations between coordinate systems of the rock drilling rig, the drilling pattern and the mine.

According to an embodiment, the apparatus is configured to produce augmented mining tunnel lines provided with combined additional data. Examples of the combined or linked data are disclosed in this document.

According to an embodiment, the apparatus is provided with scanning data of rock surfaces surrounding the rock drilling rig during the navigation procedure, whereby the scanning data comprises data on realized shapes and dimensions of each previous rounds. The apparatus is configured to combine the scanning data with the generated mining tunnel line. The scanning data may be utilized later when examining the excavated mining tunnel.

According to an embodiment, the apparatus is provided with 3D-scanning data of wall and roof surfaces of the blasted previous round. An advantage of this embodiment is that the mining tunnel line may comprise 3D model on surfaces of the mining tunnel.

According to an embodiment, the 3D-scanning data may comprises a point cloud with several points with coordinate data. The scanning may be based on laser scanning or ToF-devices (Time-Of-Flight), for example.

According to an embodiment, the generated profile data of the rounds may be utilized in following other mining operations. Reinforcing measures, such as rock bolting, may utilize this solution.

According to an embodiment, the solution relates to a method of navigating a rock drilling rig in a mining tunnel, which mining tunnel is advanced in several successive rounds. The method comprises: positioning the rock drilling rig at faces of the successive rounds; executing the navigation for each round before initiating drilling by means of the rock drilling rig; attaching in the navigation a coordinate system of the rock drilling rig to a mine coordinate system; and determining a mining tunnel line for the realized mining tunnel by combining navigation data of the several successive realized rounds, whereby the navigation is executed without a pre-determined mining tunnel line.

According to an embodiment, the method comprises deciding direction of each new round only after the navigation.

According to an embodiment, the method comprises deciding length of each new round only after the navigation.

According to an embodiment, the method comprises generating sensing data during operation in the mining tunnel. The solution further comprises linking the generated sensing data to the navigation data and thereby produces round specific sensing data.

According to an embodiment, the method comprises analyzing the realized mining tunnel line and the round specific data. The solution further present at least one point of interest on a display device in response to the executed analysis.

The above disclosed embodiments may be combined in order to form suitable solutions having those of the above features that are needed.

BRIEF DESCRIPTION OF THE FIGURES

Some embodiments are described in more detail in the accompanying drawings, in which.

For the sake of clarity, the figures show some embodiments of the disclosed solution in a simplified manner. In the figures, like reference numerals identify like elements.

DETAILED DESCRIPTION OF SOME EMBODIMENTS

Figure 1:
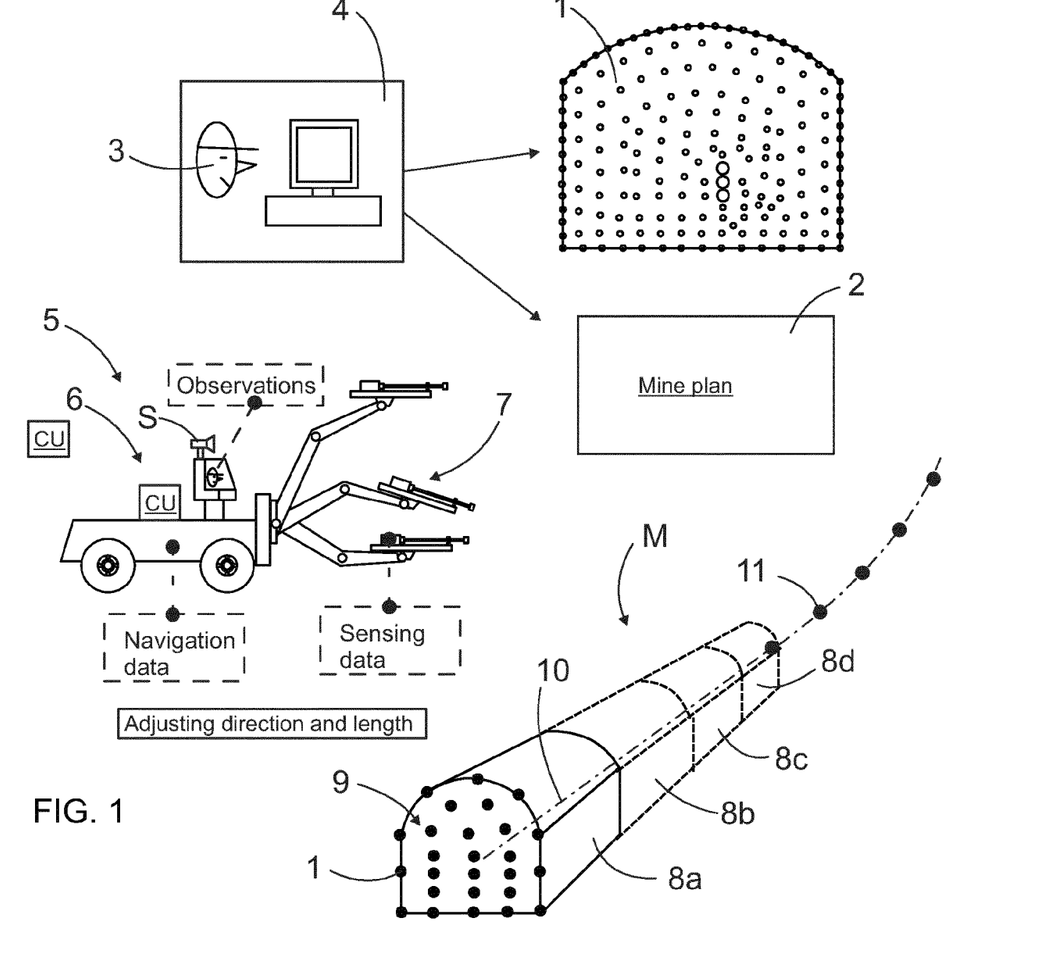
FIG. 1 is a schematic view of some issues relating to excavation of mining tunnels.

FIG. 1 discloses that drilling patterns 1 and mine plans 2 may be designed by mine engineers 3 at an office 4. The drilling pattern 1 is transmitted to a rock drilling rig 5 comprising a movable carrier 6 and one or more drilling units 7. In a drilling and blasting method a mine tunnel 8 is produced in several successive rounds 8a-8d. The rock drilling rig 5 is positioned at a face 9 of a following round and is connected to a coordinate system of the mine. The rock drilling rig drills the blast holes in accordance with the designed drilling pattern 1, where after the round 8a is blasted and the broken rock material is removed. Then a new face is formed and the rock drilling rig 5 is again positioned and navigated for drilling the next round 8b. Several successive rounds 8a-8d form together a mining tunnel line 10, which is indicated in a highly simplified manner in FIG. 1. The mining tunnel line 10 may be provided with peg numbers 11 indicating distance along the mining tunnel line. As can be noted direction of the mining tunnel line 10 may change, whereby it may comprise curves, for example. As it is discussed in this document, direction and length of the rounds can be adjusted at the drilling site by an operator of the rock drilling rig 5. The rock drilling rig 5 is provided with an on-board control unit CU and it may also communicate with one or more external control units CU. The apparatus disclosed in this document may be located in connection with the on-board or external control unit.

FIG. 1 further discloses that during the operation navigation data is produced and it may be stored and linked with sensing and monitoring data. Further, operator of the rock drilling rig may make visual and other observations and may link them with the other round specific data. The rock drilling rig 5 may also be provided with one or more scanning devices S for producing scanning data on the realized mining tunnel M.

Figure 2:
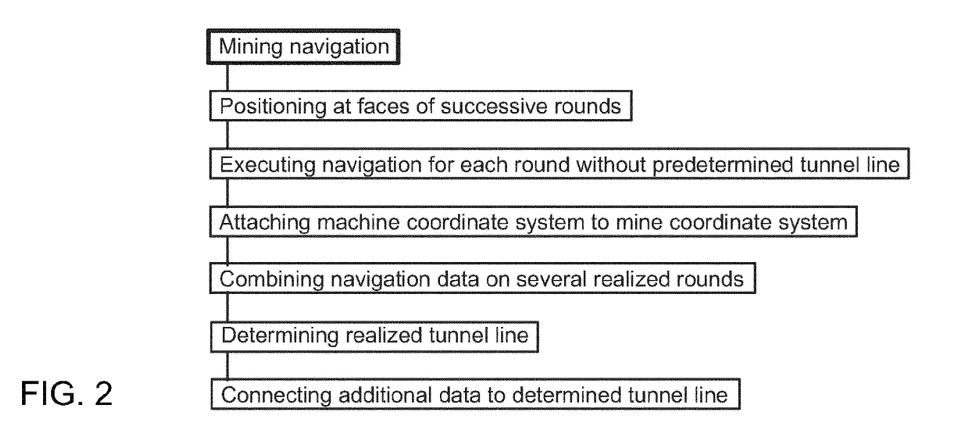
FIG. 2 is a schematic diagram of steps of the mining navigation.

FIG. 2 discloses steps and actions of the disclosed dynamic and augmented mining navigation process. The disclosed issues have already been discussed above in this document.

Figure 3:
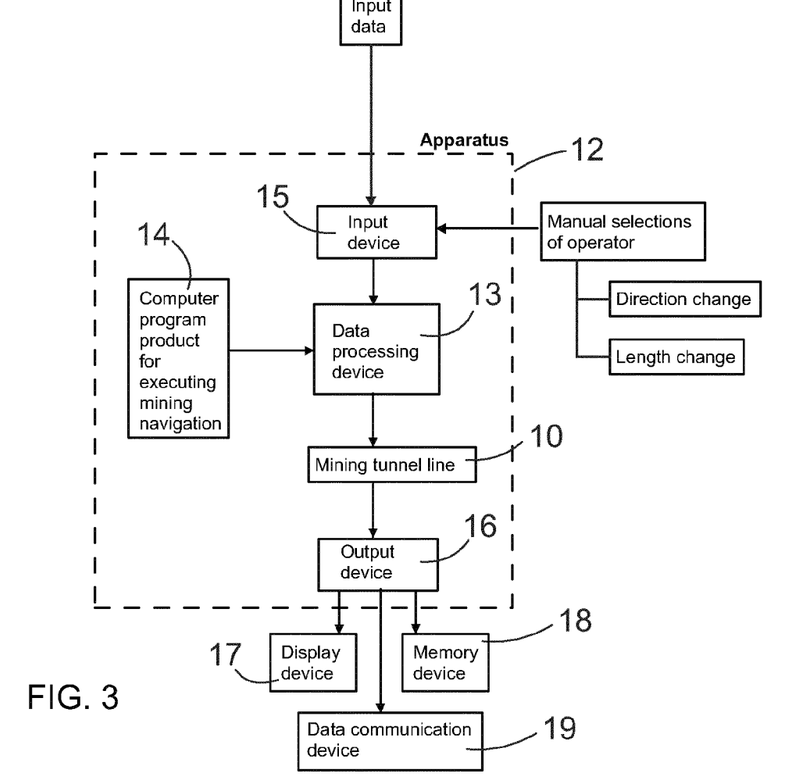
FIG. 3 is a schematic diagram of the apparatus and its components.
Figure 4:
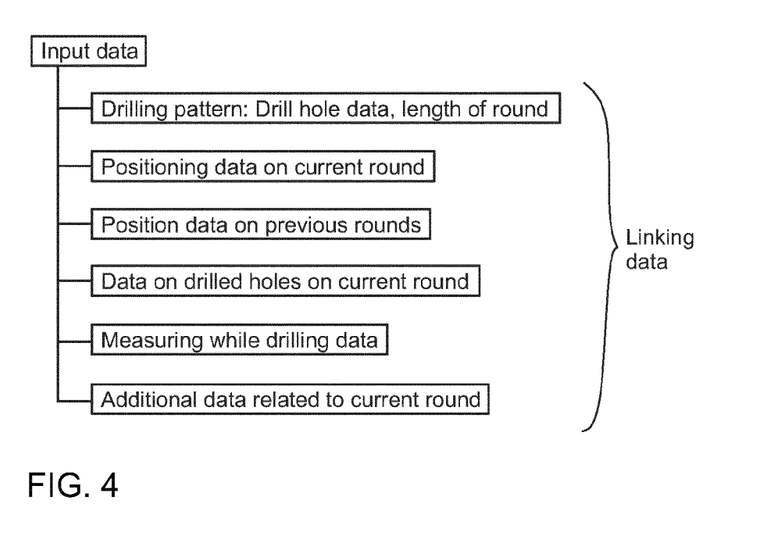
FIG. 4 is a schematic diagram of data input to the apparatus.

FIG. 3 shows basic features of the disclosed apparatus 12. The apparatus 12 comprises one or more data processing devices 13 for executing a computer program product 14 for executing the disclosed mining navigation. The input data, such as will be disclosed in the following FIG. 4, may be input to the apparatus 12 by means of an input device 15. Furthermore, the operator may input parameters and may execute selections via the input device 15. The data processing device executes the mining navigation program or algorithm and combines several separate rounds together with their round specific data and thereby forms a mining tunnel line 10. The end result may communicated further by means of an output device 16. The produced mining tunnel line and its additional data may be displayed on a display device 17, may be stored in a memory device 18, and may be transmitted to remote electrical terminal devices or servers by means of a data communication device 19.

Figure 5:
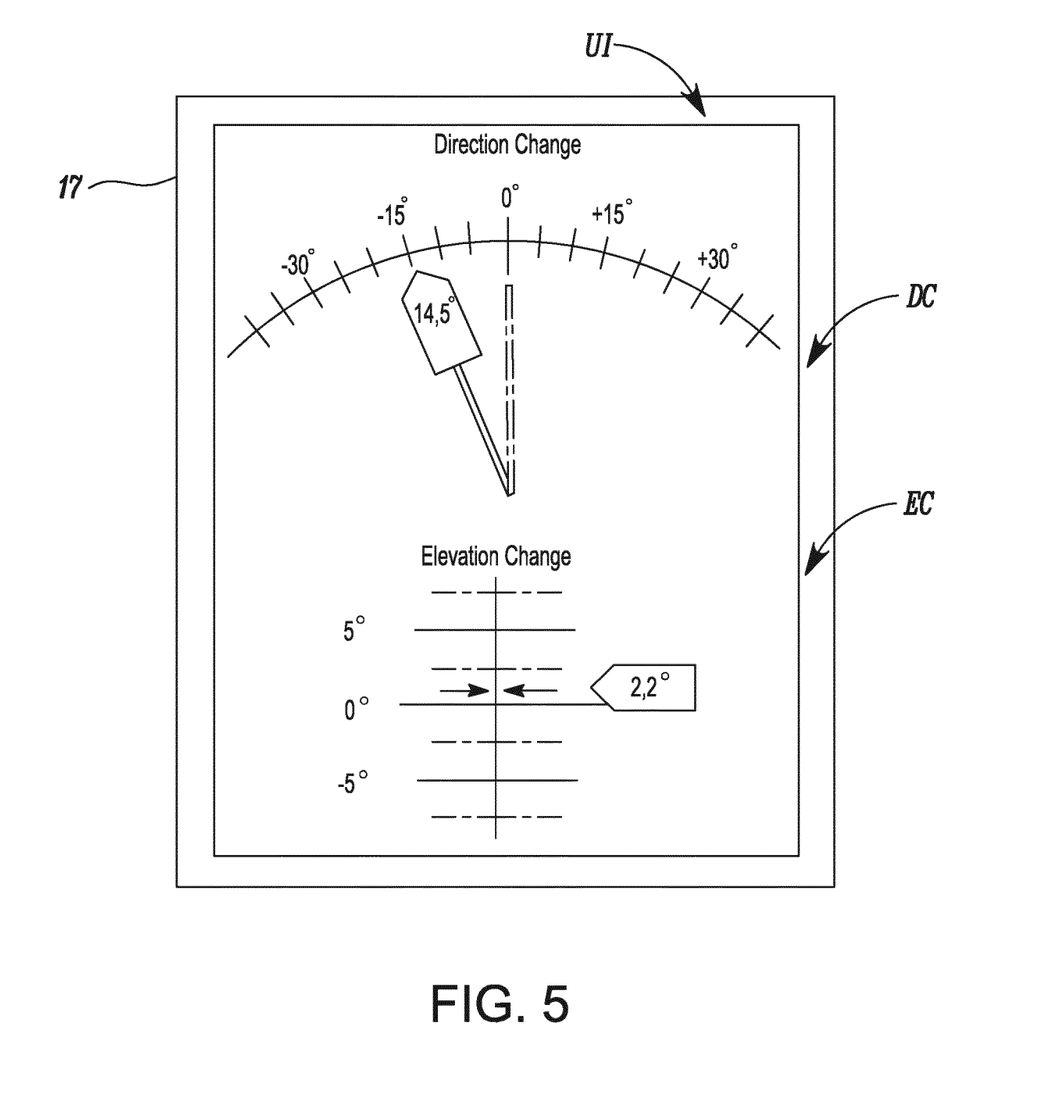
FIG. 5 is a schematic view of a user interface and graphical input elements for adjusting lateral direction and elevation of the round.

FIG. 5 discloses a view of a graphical user interface UI displayed on the display device 17. The operator of the rock drilling rig is provided with intuitive graphical means for adjusting direction and elevation. In the shown example horizontal change i.e. direction change DC is selected to be 14.5° to left, and vertical change i.e. elevation change EC is 2.2° upwards. The operator may simply adjust the selections by a pointing device or by arrow keys, for example.

Figure 6:
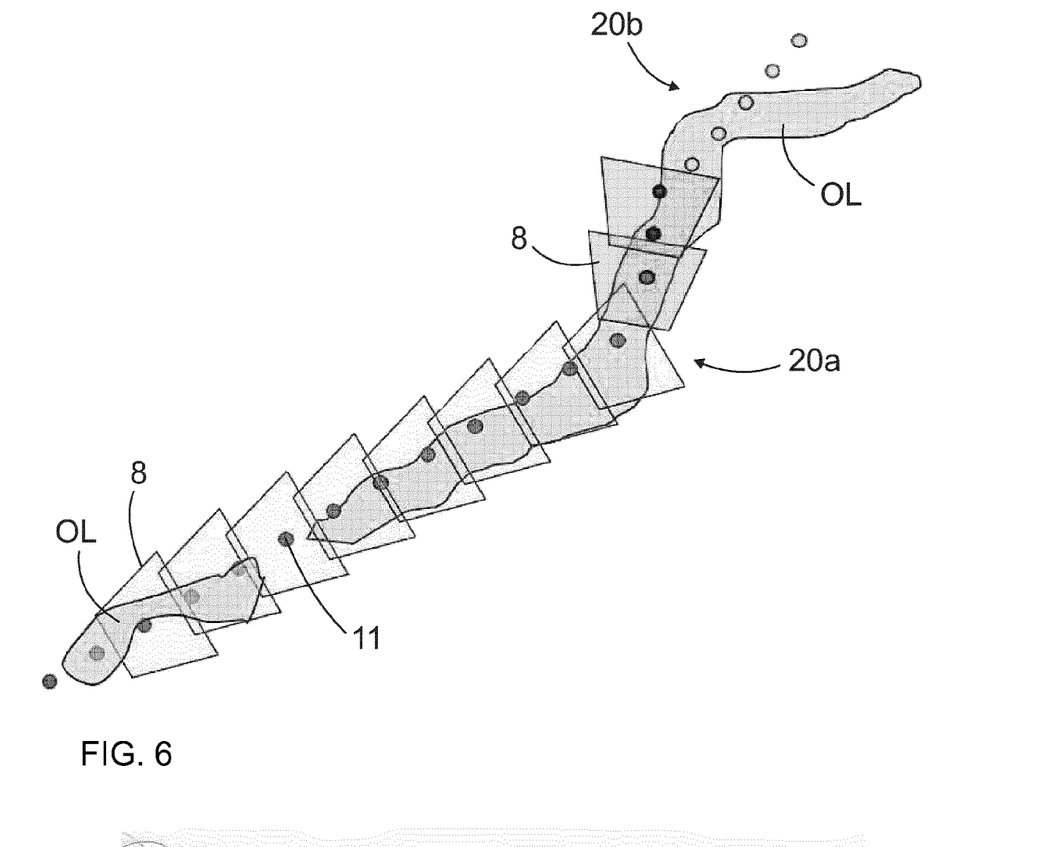
FIG. 6 is a perspective view of ore load directions and active direction adjustments in mining navigation according to the present solution, and FIGS. 7-9 disclose some schematic examples of mining tunnel lines provided with combined data.

FIG. 6 demonstrates the basic principle of the present solution. As can be noted, several rounds 8 are directed so that they follow directions of ore lodes OL. At points 20*a* and 20*b* there are sudden changes in the ore lode directions and at least at these points active directional adjustment is needed in the mining navigation. When the adjustments can be made at the work site, the ore may be fully utilized and the excavation becomes more effective.

Figure 7:
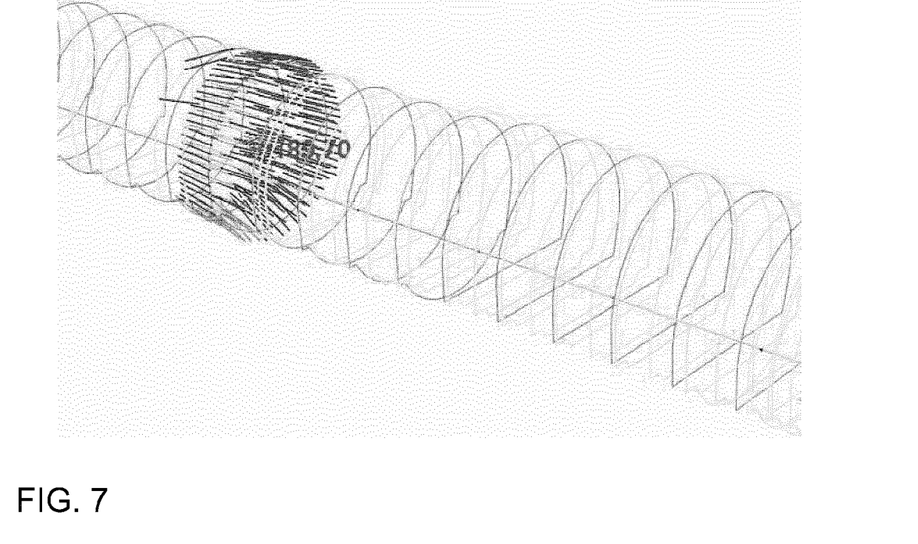

FIG. 7 shows an example of data that can be illustrated when the data is linked to dedicated rounds whose location in the mine is known thanks to the disclosed mining navigation procedure. In FIG. 7 realized blast holes of one selected round are shown.

Figure 8:
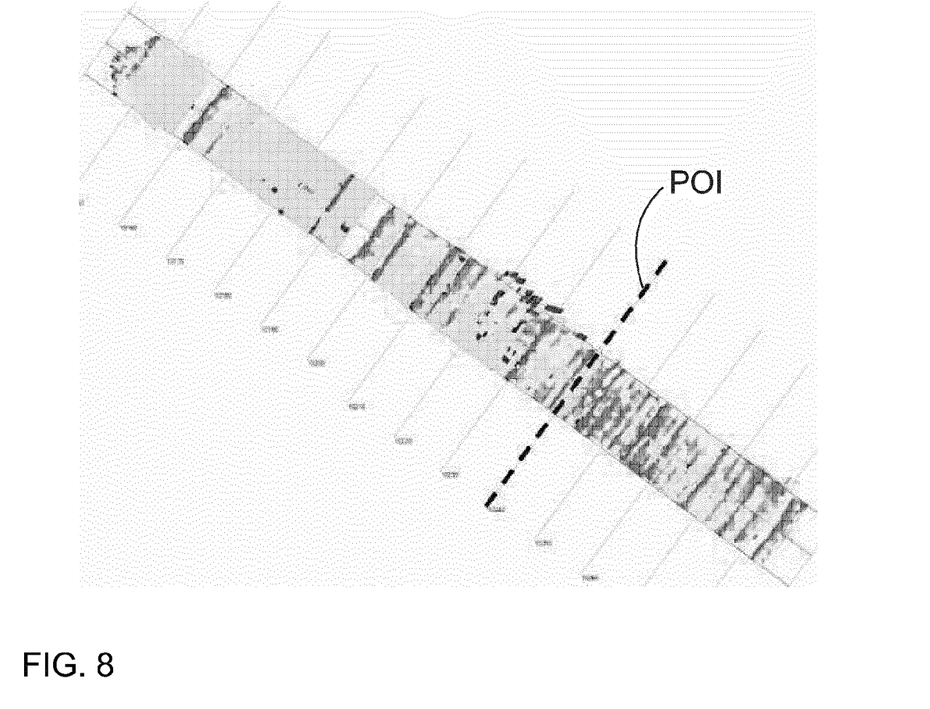

FIG. 8 shows from above a mining tunnel line provided together with analyse results. The apparatus may be configured to examine the rounds in accordance with selected principles and may produce visualizations of the results of the made analysis. In FIG. 8 the apparatus has also indicated a point of interest POI for indicating a deviation or other notable issue.

Figure 9:
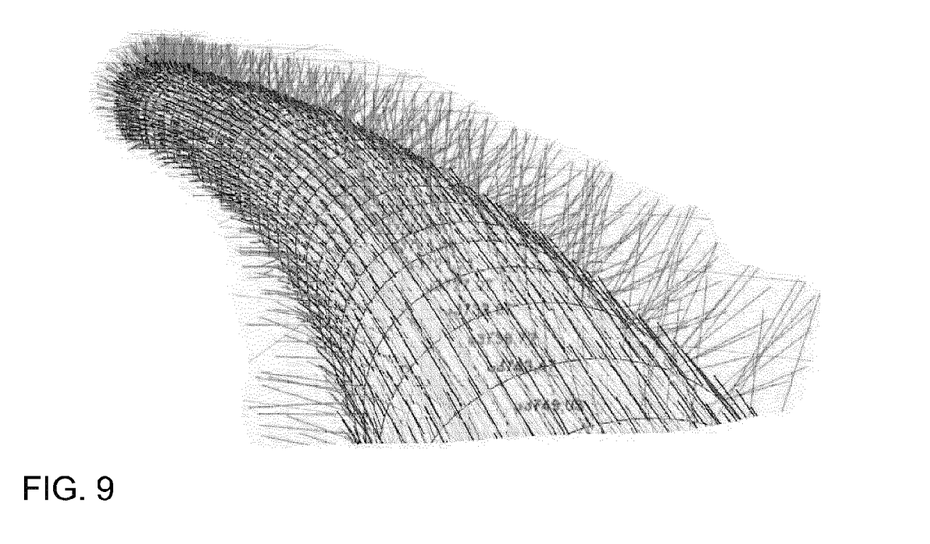

FIG. 9 discloses an example of a mining tunnel line and linked information on realized blast and reinforcing holes. The solution makes it possible to prepare awesome and informative presentations, for example.

The drawings and the related description are only intended to illustrate the idea of the invention. In its details, the invention may vary within the scope of the claims.

The invention claimed is:

1. An apparatus comprising at least one data processing device for executing at least one navigation program in order to navigate a rock drilling rig in a mining tunnel, wherein the mining tunnel is advanced in several successive rounds and the navigation is executed for each round before initiating drilling by means of the rock drilling rig; and wherein the apparatus:
   is provided with positioning data relating to determined position and direction of the rock drilling rig relative to a previously excavated round;
   is configured to determine direction and length of each following new round in response to input data and is configured to take a selected direction and length into consideration in the navigation;
   is configured to generate a tunnel line for the mining tunnel by combining the navigation results of each successive rounds one by one;
   is configured to execute coordinate transformations between a machine coordinate system of the rock drilling rig and a mine coordinate system; and
   is configured to present the produced mining tunnel line in the mine coordinate system, wherein the navigation is executed without a pre-determined mining tunnel line.

2. The apparatus as claimed in claim 1, wherein the apparatus is provided with data specific to individual rounds; and the apparatus is configured to combine the round specific data with the produced mining tunnel line.

3. The apparatus as claimed in claim 1, wherein the apparatus is configured to display the produced mining tunnel line with the realized drill holes and round specific data on a display device.

4. The apparatus as claimed in claim 1, wherein the direction of the mining tunnel is determined during the navigation process of each round and the apparatus is configured to adjust the directions of the rounds on the basis of received manual control commands.

5. The apparatus as claimed in claim 1, wherein the apparatus is configured to present on a display device graphical input elements allowing change of horizontal direction and change of vertical direction before finalizing navigation of the rock drilling for the following new round to be drilled.

6. The apparatus as claimed in claim 1, wherein the apparatus is provided with input data on a modified length of the round, whereby the apparatus is configured to adjust length of a drilling pattern for the next round in response to the input data of the modified length.

7. The apparatus as claimed in claim 1, wherein the apparatus is located onboard a rock drilling rig, whereby the mining tunnel line is generated at the drilling site during the operation of the rock drilling rig, and the apparatus further comprises a data communication device for communicating the generated mining tunnel line at intervals from the drilling site to at least one external electronic device.

8. The apparatus as claimed in claim 1, wherein the apparatus is configured to attach pre-designed drilling patterns to each round during the navigation, wherein the drilling patterns include data on drill holes to be drilled, and wherein the apparatus is configured to execute coordinate transformations between coordinate systems of the rock drilling rig, the drilling pattern and the mine.

9. The apparatus as claimed in claim 1, wherein the apparatus is provided with scanning data of rock surfaces surrounding the rock drilling rig during the navigation procedure, whereby the scanning data includes data on realized shapes and dimensions of each previous rounds, and wherein the apparatus is configured to combine the scanning data with the generated mining tunnel line.

10. A rock drilling rig comprising:
    a movable carrier; and
    at least one drilling boom connected movably to the carrier and equipped with a drilling unit, wherein the rock drilling rig is provided with an apparatus in accordance with claim 1.

11. A method of navigating a rock drilling rig in a mining tunnel, which mining tunnel is created by utilizing drilling and blasting methods, wherein rock material is removed in several successive rounds, the method comprising:
    positioning the rock drilling rig at faces of the successive rounds;
    executing the navigation for each round before initiating drilling by means of the rock drilling rig;
    attaching in the navigation a coordinate system of the rock drilling rig to a mine coordinate system; and
    determining a mining tunnel line for the realized mining tunnel by combining navigation data of the several successive realized rounds, whereby the navigation is executed without a pre-determined mining tunnel line.

12. The method as claimed in claim 11, further comprising deciding a direction of each new round only after the navigation.

13. The method as claimed in claim 11, further comprising deciding a length of each new round only after the navigation.

14. The method as claimed in claim 11, further comprising
generating sensing data during operation in the mining tunnel; and
linking the generated sensing data to the navigation data and thereby producing round specific sensing data.

15. The method as claimed in claim 14, further comprising
analyzing the realized mining tunnel line and the round specific data; and
presenting at least one point of interest on a display device in response to the executed analysis.

16. A computer program product for executing mining navigation for a rock drilling rig in a mine, wherein the computer program product comprises program code means configured to execute the steps and procedures of claim 11 when being run on a computer or a data processing device.

* * * * *